United States Patent [19]
Eichenberger et al.

[11] 3,907,440

[45] Sept. 23, 1975

[54] OPTOELECTRICAL APPARATUS

[75] Inventors: Werner Eichenberger; Karl Lapp, both of Zurich; Erich Loepfe, Zollikerberg; Hansruedi Stutz, Dietlikon, all of Switzerland

[73] Assignee: Aktiengesellschaft Gebruder Loepfe, Zurich, Switzerland

[22] Filed: Oct. 1, 1973

[21] Appl. No.: 402,187

[30] Foreign Application Priority Data
Oct. 16, 1972 Switzerland.................... 15184/72
Dec. 21, 1972 Switzerland.................... 18649/72
June 15, 1973 Switzerland.................... 8682/73

[52] U.S. Cl. ............... 356/199; 356/160; 356/205; 356/230; 356/238; 250/559; 250/578
[51] Int. Cl.² ........................................ G01N 21/18
[58] Field of Search .......... 356/159, 160, 199, 200, 356/205, 211, 230, 238, 4; 250/559, 578; 343/103

[56] References Cited
UNITED STATES PATENTS
| | | | |
|---|---|---|---|
| 2,670,651 | 3/1954 | Burns et al...................... | 356/159 X |
| 3,653,772 | 4/1972 | Berge............................. | 356/205 |
| 3,734,631 | 5/1973 | Justice et al..................... | 356/205 |
| 3,761,724 | 9/1973 | Dennis........................... | 356/205 X |

*Primary Examiner*—Ronald L. Wibert
*Assistant Examiner*—Paul K. Godwin
*Attorney, Agent, or Firm*—Werner W. Kleeman

[57] ABSTRACT

An optoelectrical apparatus comprising light transmitting means for generating at least two pulsed light beams in such a manner that the light pulses of each beam follow the light pulses of the other beam in alternate sequence, and light receiving means including light sensing means responsive to light generated by the light transmitting means and producing an electric output signal representative of the received light. There are further provided electronic means operatively connected to the output of the light sensing means and comprising means for separating from said electric output signal an electric signal originating from one of said pulsed light beams. The separated signal may be used as a reference or control signal to compensate for the effect of temperature changes or aging of the circuitry components to the output signal or signals of the apparatus.

20 Claims, 7 Drawing Figures

- LIGHT SOURCE — 1
- LENS — 27
- CASING — 21
- MEASURING AREA — M1
- 4 — LIGHT SENSOR
- 28 — LENS
- M2 — REFERENCE AREA
- 6 — DIAPHRAGM
- F — YARN
- 2 — LIGHT SOURCE

- 29 — AMPLIFIER
- 23, 24 — SEPARATION STAGES
- 30 — MULTIPLIER
- 31 — DIFFERENTIAL AMPLIFIER

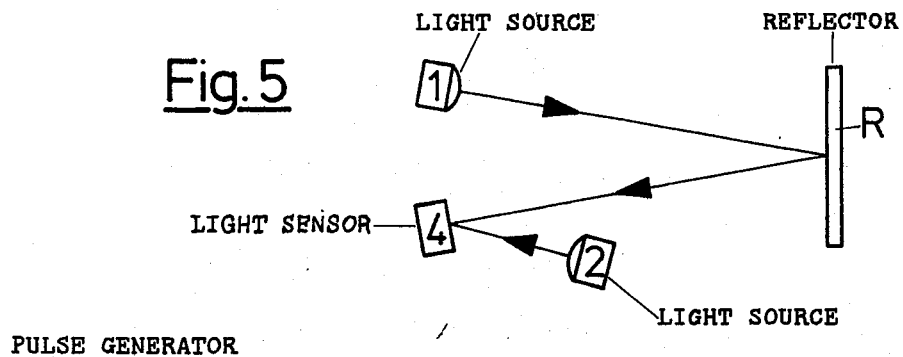
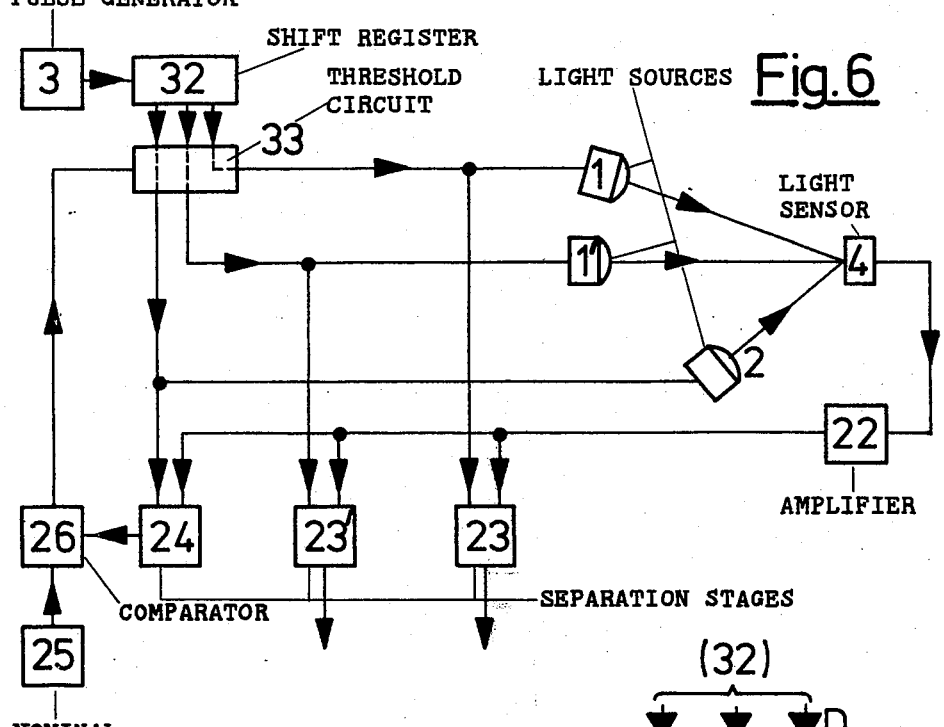
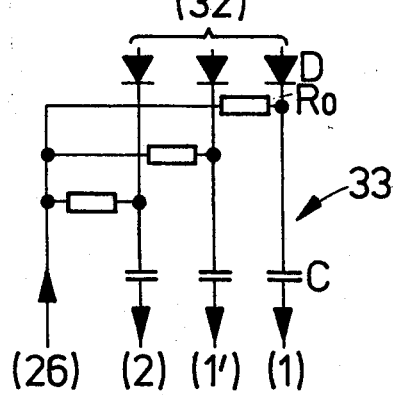

OPTOELECTRICAL APPARATUS

BACKGROUND OF THE INVENTION

The present invention relates to an optoelectrical apparatus comprising a light transmitter for generating a plurality of pulsed light beams, the light pulses of which follow each other in alternate sequence, further comprising a light receiver including a light sensor which is preferably of the semiconductor type, and an electronic circuit operatively connected in series with the light sensor for evaluating the output signals of the latter, and this invention also concerns the use of the inventive optoelectrical apparatus for a multiplicity of different purposes.

The copending U.S. Pat. application, Ser. No. 377,824, filed July 9, 1973, refers to optoelectrical apparatuses of this general type operating by reflected or directly transmitted light, and the main feature of which resides in the production of two pulsed light beams which impinge upon the light sensor, whereas the electronic evaluation circuit responds to inequalities in the intensities of the pulsed light beams or the electric signals which the sensor produces in response to said light beams. Among other things, the invention of such application is concerned with an optoelectrical apparatus serving for monitoring thread-like structures and which apparatus comprises two inertialess directional light sources and a pulse generator exciting said light sources in alternate sequence, a light receiver provided with a light sensor which receives light beams produced by the light sources, and an electronic circuit for evaluating the AC-component of the electric signal produced by the light sensor. The invention of the aforesaid application also relates, among others, to the use of said optoelectrical apparatus for monitoring threads or bobbins bearing a yarn winding in textile machines.

SUMMARY OF THE INVENTION

Now it is a primary object of the present invention to provide new and improved apparatuses of the aforementioned type having exceptional flexibility and improved accuracy of measurement.

In order to realize this object, and others which will become more readily apparent as the description proceeds, the optoelectrical apparatus of the invention is generally manifested by the features that the electronic evaluation circuit which is operatively connected in series to the output of the light sensor comprises means for separating from the output of the light sensor at least one electric signal originating from one of the pulsed beams. Due to this feature, the invention provides, as will be evident from the following description, for separation of the electric pulses, which makes possible any desired individual and/or joint processing of the latter, and thus renders possible extraordinarily versatile uses of the inventive optoelectrical apparatus.

A second object of the invention is the provision of an optoelectrical apparatus having improved long time or durable stability properties. This may be attained when the apparatus is designed for measuring changes of the intensity of at least one of the pulsed light beams caused by an object introduced into the latter, whereas a further of the pulsed light streams is not influenced by said object and serves for generating a reference signal or control signal in the evaluation circuit.

Still another object of the invention is the use of the inventive optoelectrical apparatus for measurement by transmitted light, e.g. for optical transmittancy and absorbency measurements and the like.

A further object of the invention is the use of the inventive apparatus for measurement by reflected light, e.g. for reflectance measurements, gloss measurements and the like.

The light sensor need not necessarily comprise only a single optoelectrical transducer, such as a photodiode or phototransistor. However, preferably only a single transducer is provided. A multiplicity of such transducers connected in series or parallel may be used in certain cases, however, said transducers should have similar properties with respect to sensitivity, temperature dependence and aging. Generally, the light sensor produces a single series of electric pulses in response to the pulsed light beams impinging thereupon which pulses follow each other at intervals. In an embodiment of the optoelectrical apparatus described in the aforesaid United States application Ser. No. 377,824, a thread measuring area is associated with one of the two light sources, and a compensation area is associated with the second light source. The thread measuring area serves for producing a thread signal whereas the compensation area serves for delivering a compensation signal which may be utilized to suppress the output signal of the light receiver taken in the absence of a thread, i.e. to generate a zero output signal. Moreover, changes of the sensitivity of the light sensor and of the light emission of the light sources thus may be at least partially compensated. Now, the separation of the electric signals in the inventive evaluation circuit allows for rendering the output signal independent of changes in the sensitivity of the light sensor due to temperature variations or aging; also the influence of dust and dirt on the optical system may be at least partially compensated.

The inventive apparatus makes possible, among other things, an identification of the absolute diameter or other transverse dimension of a yarn or other thread-like or filamentary structure, and elimination of the influence of ambient light. Moreover, within certain limits the undesired effect of the background noise of the light receiver may be reduced.

In the following detailed description different techniques for separating and processing the electric signals stemming from the single light sources are illustrated.

According to one such technique, one of said electric signals is used, after the separation step, for controlling the amplification in a signal channel prior to the separation; said one signal thus serves as a control or regulating signal. With a second technique, two signals gained by the separation step are combined with each other, either in analogous manner, e.g. by formng their quotient or product, or logically combined.

If desired, the separation step may be restricted to the separation of only one of the components from the electric output signal of the light sensor; in other words, only one component associated with one of the pulsed light beams may be singled out of the output signal which is an electric signal summing up the electric components generated by the sum of the pulsed light streams. In this event, the summed output signal of the light sensor may be further processed as such. The separated component signal may be transformed into a control or reference signal as will be described in the detailed description, and caused to act on the sum or summation signal or a signal derived from the same, or further processed together with the summation signal.

BRIEF DESCRIPTION OF THE DRAWINGS

The invention will be better understood and objects other than those set forth above will be apparent upon consideration of of the following detailed description thereof which makes reference to the annexed drawings wherein:

FIG. 5 illustrates an arrangement of the components of an optical system specifically adapted for measurements by reflected light;

FIG. 6 represents a further embodiment of the inventive apparatus comprising two signal channels and a control channel, and FIG. 7 is a circuit diagram of a threshold circuit shown in FIG. 6.

DETAILED DESCRIPTION OF THE PREFERRED EMBODIMENTS

Figure 1:
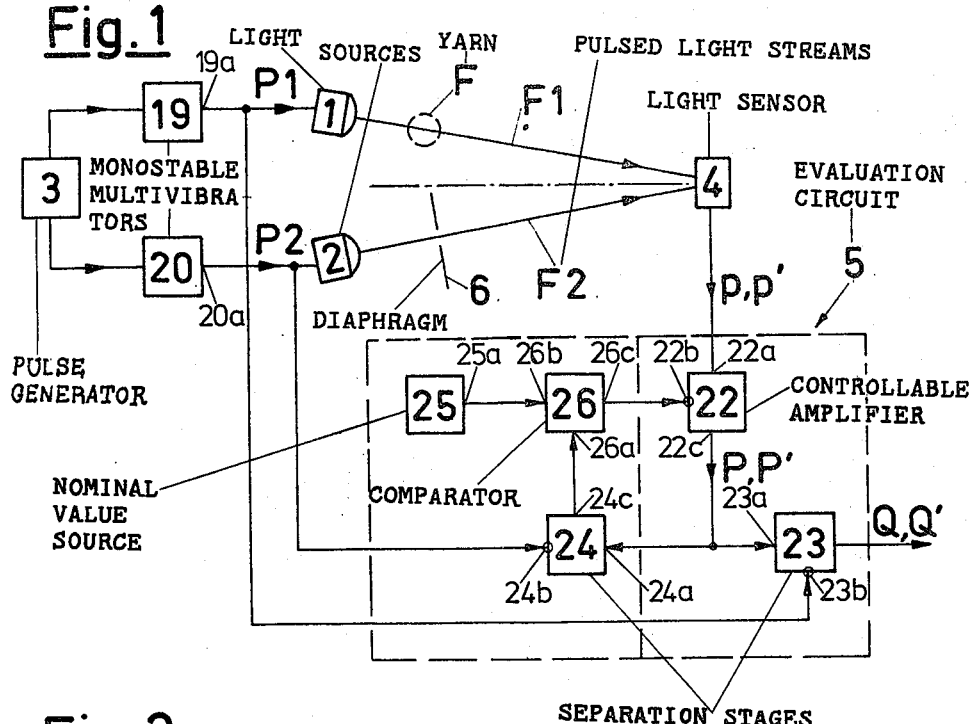
FIG. 1 is a schematic simplified representation of a first embodiment of the inventive measuring apparatus which may be used as a thread measuring device in an electronic yarn clearer.
Figure 3:
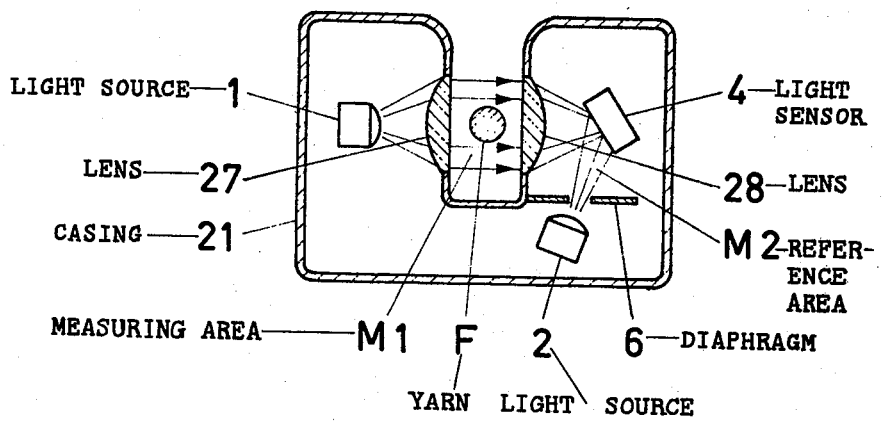
FIG. 3 is a schematic representation of a measuring unit comprising an optical system which may be used, by way of example, as a thread measuring device or for photometric purposes.

Describing now the drawings, the measuring apparatus shown in FIG. 1 comprises a light transmitter (components 1, 2, 3, 6, 19, 20) and a light receiver (components 4, 5). The optical system comprises components 1, 2, 4, 6 and is represented in FIG. 3 by a specific embodiment.

The components of the light transmitter comprise a first light source 1, a second light source 2, a pulse generator 3 designed as an astable multivibrator having two outputs phaseshifted relative to each other, two rectangular pulse generators 19, 20 individually connected to said outputs and designed, by way of example, as monostable multivibrators, and a settable diaphragm 6 associated with light source 2.

The optical system comprises, as essential components, said light sources 1, 2 which may be luminescent diodes and are each connected to the output of one of the monostable multivibrators 19 and 20, and further comprises a light sensor 4, e.g. a photodiode or a phototransistor. An object, such as a yarn F, which is represented by its cross-sectional area, is located between light source 1 and light sensor 4. The pulsed light streams or beams generated by light sources 1, 2 and received by light sensor 4 are designated by symbols F1 and F2, respectively, and depicted schematically as straight lines.

The light receiver comprises the light sensor 4 and a therewith connected electronic evaluation circuit 5 which consists of an input stage designed as a controllable amplifier 22 having a signal input 22a and a control input 22b designated by a small circle, and further consists of two separation stages 23, 24 which are connected in parallel to the output of amplifier 22. The second separation stage 24 is part of a control circuit 24, 25, 26 associated with amplifier 22. The first separation stage 23 and said control circuit process the electrical signals P, P' which are produced by amplifier 22 and correspond to the pulsed light streams F1 and F2, respectively, in a separate and different manner. The first separation stage 23 may be designed as a sample- and-hold circuit and has a signal input 23a connected to the output 22a of amplifier 22 and a control input 23b which is marked by a small circle and connected to the output 19a of the first monostable multivibrator 19.

The aforementioned control circuit comprises a sample-and- hold circuit as separation stage 24, a settable nominal value source 25 which may be a DC-voltage source in parallel with a potentiometer, and a comparator 26 designed as a differential amplifier. The signal input 24a of separation stage 24 is connected to the output 22c of controllable amplifier 22, and the control input 24b of separation stage 24 is connected to the output 20a of the second monostable multivibrator 20. The input 24c of separation stage 24 and the output 25a of nominal value source 25 are individually connected to the two inputs 26a and 26b of comparator 26. The output 26c of comparator 26 is connected to the control input 22b of controllable amplifier 22.

In the just-described measuring apparatus, the sample- and- hold circuits 23, 24 which are controlled by the outputs P1, P2 of monostable multivibrators 19 and 20, respectively, serve for separating the amplified signals P, P' produced by amplifier 22 as will be described in detail in the following description.

Astable and monostable multivibrators as used in the light transmitter as components 3, and 19, 20, respectively, are well known in the art and need not be described in detail. Sample-and-hold circuits which may be used in the described evaluation circuits as separation stages 23, 24 are also well known, and such circuits are described in Application Note ICAN-6668 of RCA. The controllable amplifier 22 may be an operational amplifier type CA3080 of RCA which is also described in said Application Note.

Alternatively, a ring modulator comprising a filter circuit, or other phase dependent rectifier circuit may be used as separation stage.

Figure 2:
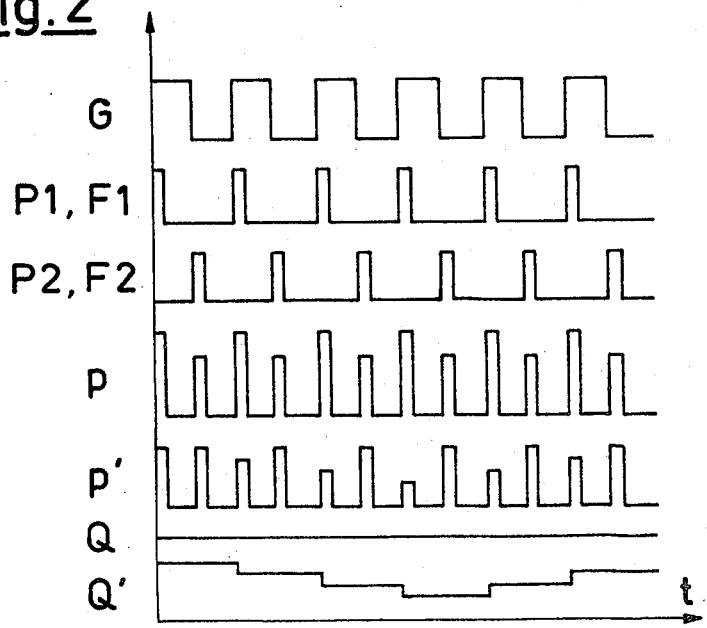
FIG. 2 illustrates a number of the pulse series generated in the measuring apparatus illustrated in FIG. 1.

Now the operation of the measuring apparatus represented in FIG. 1 will be described, also with reference to FIG. 2.

Astable multivibrator 3 delivers a first series of rectangular pulses G to monostable multivibrator 19, and a second series of rectangular pulses having a phase shift of 180° in relation to pulses G, to monostable multivibrator 20. The monostable multivibrators 19, 20 thus provide two series of short rectangular pulses P1, P2 wherein each pulse of one series occurs at the gap between two pulses of the other series. Luminescent diodes 1, 2 produce corresponding series of light pulses F1, F2 following each other with intervals and being united in light sensor 4. The light sensor 4 produces a sum or summation signal p or p', see FIG. 1, which is composed of electrical pulses generated by light pulses F1 and F2, respectively. Let it be assumed that the sum signal p in FIG. 2 and accordingly the sum signal P amplified by amplifier 22 is formed in the absence of a thread F. Then, the higher pulses in series p and P represent the light pulses F1, and the lower pulses represent the light pulses F2. The amplification of controllable amplifier 22 is defined by a voltage delivered from nominal value source 25 to comparator 26. This voltage is set prior to the measuring operation such that the amplification of controllable amplifier 22 assumes a predetermined value.

The output pulses P of amplifier 22 are delivered to the signal inputs 23a, 24a of the first and second separation stages 23, 24. Separation stage 23 produces an output signal in the form of a DC-voltage proportional to the amplitude of the light pulses F1, as shown by the horizontal straight line, identified by reference character Q, in the lowermost diagram of FIG. 2. Separation stage 24 furnishes a voltage proportional to the amplitude of the light pulses F2. When, by way of example, screen aperture 6 is changed and thereby the amplitude of F2 is varied, separation stage 24 delivers a correspondingly varied voltage to comparator 26. Thereby, the output voltage of the latter is varied and the amplification of amplifier 22 adjusted in such a manner that the output voltage of separation stage 24 is equalized to the voltage produced by nominal value source 25. Now when in the course of time the sensitivity of light sensor 4 will change, e.g. because of temperature rise or aging, amplifier 22 compensates for this change automatically with the help of control circuit 24, 25, 26. In the event that light sensor 4 or amplifier 22 produce an immanent noise, this noise will be also compensated for to a great extent since the control circuit tends to maintain the output voltage of amplifier 22 at a constant level.

Assuming that a yarn F having a thickened portion enters the pulsed light stream or beam F1 as shown in FIG. 1, and is pulled lengthwise through such light stream, then light sensor 4 produces an electric signal $p'$, and amplifier 22 produces an amplified signal $P'$ in which the amplitudes of the electric pulses stemming from light stream F1 are modulated with the respective diameters of the yarn, whereas the electric pulses generated by light stream F2 are left unchanged. Then the output $Q'$ of separation stage 23 follows the diameter of the yarn and indicates the changes of the latter in the shape of a stepped curve. The respective yarn diameter is essentially proportional to the vertical distance of the associated step of curve $Q'$ from the horizontal straight line Q in the lowermost diagram of FIG. 2. The pulses of equal amplitude in signal $P'$ stemming from light stream F2 are not reproduced in the output signal Q, $Q'$ of separation stage 23 in a direct manner, however, they define through control circuit 24, 25, 26 and amplifier 22 the magnitude of output signal Q, $Q'$.

The measuring unit shown in FIG. 3 in cross sectional view through its casing 21 comprises, in addition to the aforementioned components of the optical system, two plano-convex lenses 27, 28 having their plane surfaces in parallel and opposite arrangement and defining between them a measuring area M1. The first light source 1 is located in the left part of the unit and essentially in the focus of the first lens 27, and the light sensor 4 is arranged in the right part of the unit with its optical axis forming an angle with the common optical axis of said lenses 27, 28. The light beams from light source 1, after collimation by the first lens 27 and passage through the second lens 28 are focussed in sensor 4. Beneath the latter the second light source 2 and diaphragm 6 are positioned such that the light beams coming from this source and passing through diaphragm 6 impinge upon sensor 4. Measuring area M1 is part of a U-shaped channel traversing casing 21 of the unit and in the sidewalls of the channel are mounted the lenses 27, 28. Casing 21 encloses the optical system of the measuring unit in a dustproof manner, so that a reference area M2 located between the second light source and light sensor 4 and associated with diaphragm 6 is separated in a dustproof manner from the exterior of the measuring unit. This feature is important and should be considered when compensation of the effect of dust in the measuring area M1 is desired. An object, e.g. a yarn F, to be measured and supervised is illustrated in measuring area M1 by its cross-sectional area.

Figure 4:
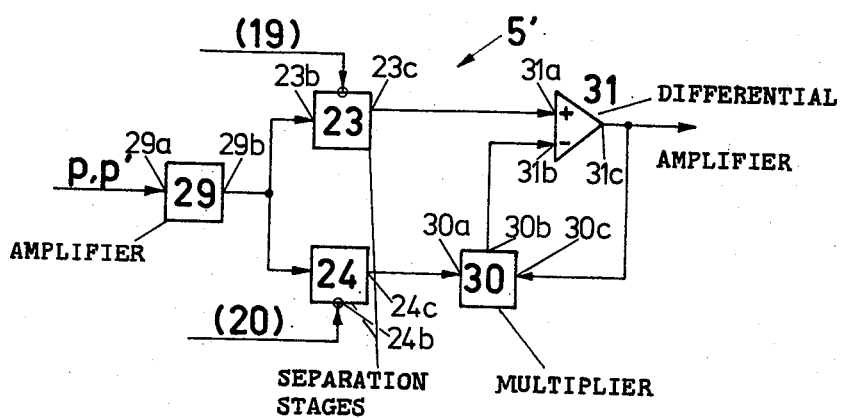
FIG. 4 illustrates an embodiment of an electronic evaluation circuit which is modified in relation to the one illustrated in FIG. 1.

Now referring to FIG. 4, the electronic evaluation circuit $5'$ which is modified in relation to the one discussed above with respect to FIG. 1 comprises an amplifier 29 the input 29a of which is connected to light sensor 4, two separation stages 23, 24 which are connected in parallel to the output 29b of amplifier 29 and designed as sample-and-hold circuits, and further comprises a multiplier circuit 30, a first input 30a of which is connected to the output 24c of sample-and-hold circuit 24, and a differential amplifier 31, the plus-input 31a of which is connected to the output 23c of the first sample-and-hold circuit 23 and the minus input 31b of which is connected to the output 30b of multiplier circuit 30. Moreover, the output 31c of differential amplifier 31 is connected to a second input 30c of multiplier 30. The light transmitter and optical system may be designed as shown in connection with FIG. 1; the control inputs 23b, 24b of sample-and-hold circuits 23, 24 may be each individually connected to the respective associated output of one of the monostable multivibrators 19 and 20.

The evaluation circuit $5'$ furnishes the quotient of the signals delivered by separating stages 23, 24 which signals represent the light streams F1 and F2, respectively. Changes with time of the sensitivity of light sensor 4, which evidently have the same relative effect on both signals, will thus be compensated by this evaluation circuit. Moreover, any change (increase or decrease) of the light emission of said light sources will be compensated insofar as said change occurs in relatively equal amounts in both light sources. However, when the light emission decreases in said light sources in relatively different amounts and a predetermined tolerance is exceeded in the course of time, a readjustment of the apparatus is desirable. This can be done by changing the light streams, e.g. the light stream coming from luminescent diode 2, by adjusting the apertured screen 6, or, in the manner described in United States application Ser. No. 377,824, by varying the relation of the electrical signals P1, P2 supplied to the luminescent diodes.

Such a measuring apparatus may be used, when designed in appropriate manner, for relative or absolute absorption measurements in solid, liquid or gaseous media, e.g. turbidity measurements, densitometric and similar photometric measurements.

When an evaluation circuit $5'$ as illustrated in FIG. 4 is used together with an optical system in which the areas between the light sources 1, 2 on the one hand, and light sensor 4, on the other hand, are exposed to the effects of dust from the exterior space to about the same degree, the effects of the dust will be compensated to a high degree.

If desirable, a circuit as illustrated in FIG. 4 may be provided with a control circuit as described with reference to FIG. 1, or with a control circuit as will be described in connection with FIG. 6.

The optical system illustrated in FIG. 5 may serve, by way of example, for measurements of the reflectance of the surface of a reflector R. The latter may be a specular reflecting object, e.g. a polished metallic body, or an object having a diffusely reflecting surface, e.g. a paper web. The optical system comprises two light sources 1, 2 and a light sensor 4, however the first light source 1 is arranged differently relative to the one in FIG. 1 and in such a manner that the light emitted from it does not directly reach the sensor 4, but only after reflection at reflector R.

The remaining components of the measuring apparatus may be designed in the manner described with reference to FIG. 1. The case of the void measuring area (FIG. 1) corresponds to the case that in FIG. 5 a reflector R of a defined reflectance is present, which is represented by a definite nominal value or reference value of the output signal Q. With such an apparatus, deviations of reflectance may be measured quantitatively by static measurement with fixed reflector R as well as by continuous measurement e.g. with a traveling web, such as textile or paper web. The apparatus may also be used in edge control equipment for traveling webs as illustrated in the aforementioned United States application Ser. No. 377,824.

The apparatus illustrated by FIG. 6 differs from the one shown in FIG. 1 in two respects. Firstly it comprises three data channels, i.e. a first signal channel 1-4-22-23, a second signal channel 1'-4-22-23', and a control channel 2-4-22-24-26-33. Secondly, the aforesaid control channel controls the light transmitter, particularly the electric signals supplied to the light sources, rather than the amplifier 22 of the receiver. In agreement with FIG. 1, a closed control loop is provided, however, the latter effects the light streams generated by the light sources 1, 1' rather than the amplification of amplifier 22 as is the case with amplifier 22 in FIG. 1.

The output signals of the two signal channels may be processed independently from each other, or they may be delivered to an analog and/or logic processing circuit for combining them operatively, dependent upon the desired use of the measuring apparatus.

In the apparatus of FIG. 6, three light sources 1, 1', 2 are provided, light streams of which impinge upon light sensor 4. A pulse generator 3 which may be an astable multivibrator furnishes a series of short-timed rectangular pulses which are delivered to a delay network, e.g. a shift register 32, having three outputs. These outputs provide three series of pulses which are delayed in relation to each other and the pulses of which do not overlap. This series of pulses are individually supplied to the light sources 1, 1' and 2 through a controllable threshold circuit 33. The pulsed light streams generated by said light sources produce a series of electric pulses at the output of light sensor 4, which pulses are amplified by amplifier 22 and delivered to separation stages 23, 23', 24. The latter are controlled and activated by the electric pulses supplied to light sources 1, 1', 2 in similar manner as described with reference to FIG. 1, so that each of the separation stages responds only to the electric signals generated by the associated light source. The control circuit 24, 25, 26 delivers a control signal to the controllable threshold circuit 33 when the output voltage of separation stage 24 deviates from the nominal voltage furnished by nominal value source 25. Thus, the amplitudes of the electric pulses supplied to the light sources are varied as long as the output voltage of separation stage 24 does not coincide with said nominal voltage.

FIG. 7 illustrates a controllable threshold circuit 33 comprising, in each of the operational connections between the three outputs of shift register 32 and light sources 1, 1', 2, a series connection of a diode D and a capacitor C. Each series connection is supplied with a control voltage provided by comparator 26 through a resistor Ro to the junction or midpoint between diode D and capacitor C. In order to avoid deformations of the rectangular pulses supplied to the light sources, the time-constant of each RoC-series connection should be at least a hundred times the duration of one of the rectangular pulses.

The apparatus illustrated in FIG. 6 may be used for concurrent and continuous measurements of two objects, e.g. yarns. An example of such a use is the supervision of the diameters or other transverse dimension of two traveling yarns being doubled in the initial twisting process. The number of data channels may be further increased. It is also possible with such a multichannel apparatus to perform two or more independent measurements on the same object, e.g. to measure or supervise the diameters or transverse dimensions of a yarn in two directions perpendicular to each other.

When separate output signals from two signal channels are desired, the output signals of the separation stages 23, 23' are separately processed, e.g. each delivered to an indication device, eventually after appropriate transformation. It may be advantageous, e.g. when used in a yarn clearer, to combine the output signals of the separation stages which represent the transverse dimensions of a yarn in two different directions, by analog combination, e.g. multiplication. Moreover, said output signals may be combined by logical combination with the help of known methods and circuits.

Further applications of the inventive optoelectrical apparatus, in addition to the aforementioned ones, are the following: as color mark scanner, as code scanner using visible or infrared light having a fixed wavelength, or light the wavelength of which is shifted by luminescence, as scanner in reading equipment, as line scanner in pantographs, in master-and-slave controls and so on.

In FIGS. 1 and 6 there are illustrated optoelectrical apparatuses comprising a control or stabilization channel, whereas FIG. 4 demonstrates an evaluation circuit effecting an analog combination, particularly forming the quotient, of two signals derived from the light sensor. Other embodiments of the control channel are possible; thus, the pulsed light streams impinging upon light sensor 4 may be controlled by a light valve controlled by electrical signals, such as a Kerr cell arrangement.

The inventive optoelectrical apparatuses have an extremely good stability over a long time span which cannot be attained by comparable optoelectrical devices. Such stability is essential for technical and field applications affording continuous control of certain data which vary with time, when control is performed over long intervals, e.g. some months. Examples of such uses are yarn clearing in spinning plants, and continuous turbidity or smoke density measurements in factories or in the open air.

Moreover, the new apparatuses do not respond to ambient light, e.g. sunlight or light from incandescent lamps or even to light pulsed with a high frequency which is similar to that of the pulses generated by the light sources 1, 2, since in the latter case the pulses of the ambient light might effect the light receiver only when the phases of the pulses of the ambient light would exactly coincide with those of the pulses generated in the apparatus, which event is not likely to occur in practice.

While there is shown and described present preferred embodiments of the invention, it is to be distinctly understood that the invention is not limited thereto, but may be otherwise variously embodied and practiced within the scope of the following claims. ACCORDINGLY,

What is claimed is:

1. An optoelectrical apparatus, comprising light transmitting means for generating at least two pulsed light beams in such a manner that the light pulses of each beam follow the light pulses of the other beam in alternate sequence, said light transmitting means including at least two light sources and means for generating in alternate sequence at least two series of electric pulses which are individually supplied to the light sources, light receiving means including light sensing means responsive to light generated by the light transmitting means and producing an electric output representative of the waveform of the received light, and electronic evaluation means operatively connected to the output of the light sensing means and comprising means for separating from said electric output at least one electric signal originating from one of said pulsed light beams, said separating means including at least one controllable separation stage having a signal input and a control input, the electric output of the light sensing means being supplied to the signal input and one of said series of electric pulses generated by the light transmitting means being supplied to the control input such that the separation stage is responsive only to the component of the electric output of the light sensing means which is due to said one series of electric pulses which controls said separation stage.

2. The optoelectrical apparatus as claimed in claim 1, wherein the separating means comprises a number of controllable separation stages, which number corresponds to the number of pulsed light beams, each separation stage comprising a signal input and a control input, and wherein the electric output of the light sensing means is supplied to the signal inputs of all separation stages, and each of said series of electric pulses supplied to the light sources is also supplied individually to the control input of one of the separation stages such that this one separation stage is responsive only to the component of the electric output which is due to the series of electric pulses which controls this separation stage.

3. The optoelectrical apparatus as claimed in claim 2, wherein a measuring area is associated with at least one of the pulsed light beams and a second area is associated with one other pulsed light beam, such that an object which has entered into the measuring area acts on the at least one pulsed light beam rather than the other pulsed light beam.

4. The optoelectrical apparatus as claimed in claim 2, comprising data paths extending from the light transmitting means through the light sensing means and electronic evaluation means, one such data path being associated with each light source, controllable circuit means connected in series with said data paths, the output of one of the separation stages being operatively connected for controlling said controllable circuit means.

5. The optoelectrical apparatus as claimed in claim 4, wherein the controllable circuit means is a controllable amplifier arranged in the electronic evaluation means.

6. The optoelectrical apparatus as claimed in claim 4, wherein the controllable circuit means is arranged in the light transmitting means for controlling the electric pulses supplied to the light sources.

7. The optoelectrical apparatus as claimed in claim 4, wherein a control circuit is provided which comprises, as an input stage, a controllable separation stage having control and signal inputs, a settable nominal value source, and, as an output stage, a comparator circuit having first and second inputs connected to the outputs of the separation stage and nominal value source, respectively, said control input being controlled by one of the electric pulse series supplied to the light sources, and said signal input being operatively connected in series with the output of said light sensor, and wherein the output of the control circuit is connected to control the data paths.

8. The optoelectrical apparatus as defined in claim 1, wherein the light sources and light sensing means are arranged such that at least two of the pulsed light beams pass along intersecting optical paths from the light sources to the light sensing means.

9. The optoelectrical apparatus as claimed in claim 1, wherein light reflection means are provided in at least one of the optical paths between the light sources and light sensing means.

10. The optoelectrical apparatus as claimed in claim 2, wherein circuit means having at least two inputs are provided for operationally combining the output signals of at least two of said separation stages.

11. The optoelectrical apparatus as claimed in claim 1, wherein the pulse generating means comprises an astable multivibrator having two phase-shifted outputs, and two monostable multivibrators each of which is individually connected in series with one of said outputs for generating two series of electric pulses in alternate sequence.

12. The optoelectrical apparatus as claimed in claim 1, wherein the pulse generating means comprises a pulse generator having one output and a shift register having a plurality of differently delayed outputs, said shift register being operatively connected in series with said pulse generator for generating a plurality of series of electric pulses in alternate sequence.

13. An optoelectrical apparatus, comprising light transmitting means for generating at least two pulsed light beams in such a manner that the light pulses of each beam follow the light pulses of the other beam in alternate sequence, light receiving means including light sensing means responsive to light generated by the light transmitting means and producing an electric output representative of the waveform of the received light, and electronic evaluation means operatively connected to the output of the light sensing means and comprising means for separating from said electric output at least one electric signal originating from one of said pulsed light beams, and wherein the separating means comprises a plurality of sample-and-hold circuits operatively connected in series with the light sensing means.

14. The optoelectrical apparatus as defined in claim 1, arranged as a measuring unit wherein the light sources comprise two luminescent diodes, a settable optical diaphragm located in the path between one of the light sources and the light sensing means, the measuring unit being received in a casing separating said measuring unit from the exterior space.

15. The optoelectrical apparatus as claimed in claim 14, wherein the casing comprises an open U-shaped channel having two parallel sidewalls in which are fixed two focussing lenses in opposite relationship, one of the light sources being located within the casing adjacent one of said lenses, and the light sensing means being located within the casing adjacent the other lens.

16. The apparatus as defined in claim 1, designed for measuring changes of the intensity of at least one of the pulsed light beams, said changes being caused by an object entered into said light beam, whereas a further pulsed light beam which is not influenced by said object serves for producing an electric reference or control signal in the electronic evaluation means.

17. The use of the apparatus as claimed in claim 16, for optical absorbency measurements.

18. The use of the apparatus as claimed in claim 16, for reflectance measurements.

19. The use of the apparatus as claimed in claim 16, for monitoring traveling thread-like objects in textile machines.

20. The use of the apparatus as claimed in claim 16, for monitoring yarn in an electronic yarn clearer on a yarn winding machine.

* * * * *